United States Patent [19]
Yamada et al.

[11] Patent Number: 5,121,197
[45] Date of Patent: Jun. 9, 1992

[54] METHOD FOR PROCESSING HALF TONE IMAGES TO IMPROVE EFFICIENCY OF DATA COMPRESSION

[75] Inventors: Hirokazu Yamada; Akio Nakajima; Toshio Tsuboi, all of Osaka, Japan

[73] Assignee: Minolta Camera Kabushiki Kaisha, Osaka, Japan

[21] Appl. No.: 483,381

[22] Filed: Feb. 22, 1990

[30] Foreign Application Priority Data

| Feb. 23, 1989 | [JP] | Japan | 1-044139 |
| Apr. 17, 1989 | [JP] | Japan | 1-096862 |
| Apr. 17, 1989 | [JP] | Japan | 1-096863 |
| Apr. 17, 1989 | [JP] | Japan | 1-096864 |

[51] Int. Cl.⁵ .............................................. H04N 1/46
[52] U.S. Cl. .................................................... 358/75
[58] Field of Search ............................ 358/75–80, 358/261.1, 457–458

[56] References Cited

U.S. PATENT DOCUMENTS

| 3,795,765 | 3/1974 | DeGroat et al. | 178/6 |
| 3,919,476 | 11/1975 | Torpie | 178/68 |
| 4,057,834 | 11/1977 | Nakagome et al. | 358/133 |
| 4,092,676 | 5/1978 | Saran | 358/261 |
| 4,229,768 | 10/1980 | Kurahayashi et al. | 358/261 |
| 4,663,662 | 5/1987 | Sekizawa et al. | 358/75 |
| 4,829,370 | 5/1989 | Mayne et al. | 358/78 |
| 4,860,026 | 8/1989 | Matsumoto et al. | 358/75 |
| 4,970,586 | 11/1990 | Sunda et al. | 358/80 |

Primary Examiner—Stephen Brinich
Attorney, Agent, or Firm—Willian Brinks Olds Hofer Gilson & Lione

[57] ABSTRACT

There is disclosed a method for processing image data wherein each picture element represented by a two dimensional density pattern in a form of matrix of M rows and N columns is transformed to a one dimensional density pattern and image data represented by one dimensional density patterns are compressed by a conventional data compression method.

19 Claims, 18 Drawing Sheets

Direction of data compression

Fig. 7  (Half tone image data)

| 00 | 01 | 02 | 03 | 04 | 05 | 06 | 07 | ... |
| 10 | 11 | 12 | 13 | 14 | 15 | 16 | 17 | ... |
| 20 | 21 | 22 | 23 | 24 | 25 | 26 | 27 | ... |
| 30 | 31 | 32 | 33 | 34 | 35 | 36 | 37 | ... |

(Reconstructed image data)

| 01 | 21 | 03 | 23 | 05 | 25 | 07 | 27 | ... |
| 10 | 30 | 12 | 32 | 14 | 34 | 16 | 36 | ... |
| 11 | 31 | 13 | 33 | 15 | 35 | 17 | 37 | ... |
| 00 | 20 | 02 | 22 | 04 | 24 | 06 | 26 | ... |

Fig. 14
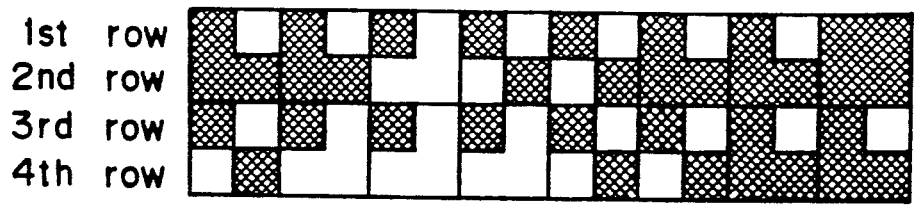
Fig. 15
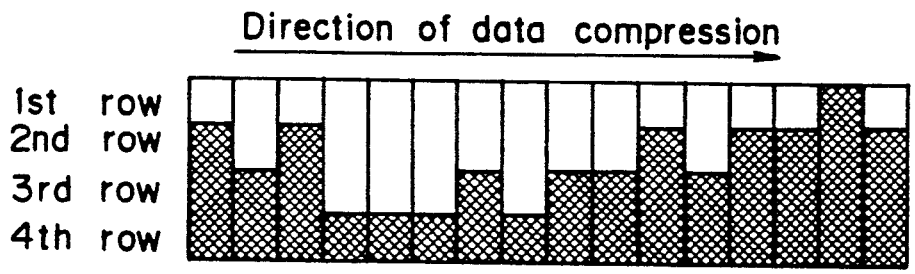
Fig. 16
(a) [1 1 0 1 0 1 1 1] → [1 1 0 0 1 1 1 1]
(b) *0 0 1 0 1* → *0 0 0 1 1*
(c) [1 0 1 0 * * * *] → [1 1 0 0 * * * *]
O : WHITE
1 : BLACK
* : WHITE or BLACK
Fig. 17
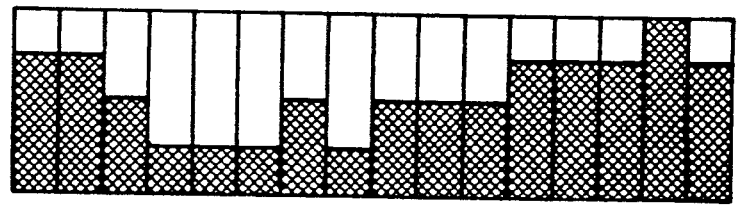

Fig. 21
| 00100 | → | 00000 |
| 11011 | → | 11111 |
| 10100 | → | 10000 |
| 00101 | → | 00001 |
| 01011 | → | 01111 |
| 11010 | → | 11110 |
O : WHITE
1 : BLACK
Fig. 22
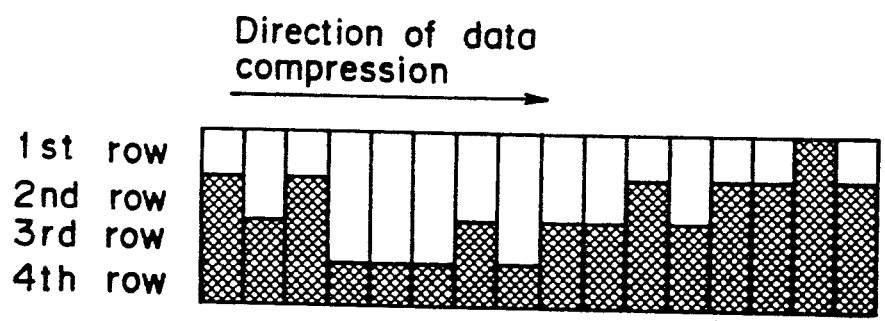
Fig. 23
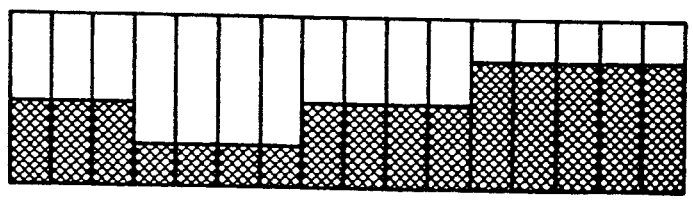

(Half tone image)

| | | | | | | | | | |
|---|---|---|---|---|---|---|---|---|---|
| 1st row | 00 | 01 | 02 | 03 | 04 | 05 | 06 | 07 | ... |
| 2nd row | 10 | 11 | 12 | 13 | 14 | 15 | 16 | 17 | ... |
| 3rd row | 20 | 21 | 22 | 23 | 24 | 25 | 26 | 27 | ... |
| 4th row | 30 | 31 | 32 | 33 | 34 | 35 | 36 | 37 | ... |

(Reconstructed image)

| | | | | | |
|---|---|---|---|---|---|
| 1st row | 01 | 21 | 03 | 23 | ... |
| 2nd row | 11 | 31 | 13 | 33 | ... |
| 3rd row | 00∀10 | 20∀30 | 02∀12 | 22∀32 | ... |

(Reconstructed image)

| | | | | | | | | |
|---|---|---|---|---|---|---|---|---|
| 1st row | 00 | 01 | 02 | 03 | 04 | 05 | 06 | 07 | ... |
| 2nd row | 10 | 11 | 12 | 13 | 14 | 15 | 16 | 17 | ... |
| 3rd row | 20 | 21 | 22 | 23 | 24 | 25 | 26 | 27 | ... |

(Half tone image)

| | | | | | |
|---|---|---|---|---|---|
| 1st row | 20∨10 | 00 | 22∨12 | 02 | ... |
| 2nd row | $\overline{20}$∧10 | 10 | $\overline{22}$∧12 | 12 | ... |
| 3rd row | 21∨11 | 01 | 23∨13 | 03 | ... |
| 4th row | $\overline{21}$∧11 | 11 | $\overline{23}$∧13 | 13 | ... |

METHOD FOR PROCESSING HALF TONE IMAGES TO IMPROVE EFFICIENCY OF DATA COMPRESSION

BACKGROUND OF THE INVENTION

1. Field of the Invention

The present invention relates to a method for processing half tone image data.

2. Related Art

As well known to those skilled in the art, in a data transmitting machine such as a facsimile machine, data to be transmitted are compressed at the transmission side to reduce or shorten a communication time and the compressed data are expanded at a receiving side.

The data compression and expansion is performed under a predetermined rule such as MH method, MR method or the like which is designed so as to be able to transmit usual documents containing characters and figures effectively. Namely, in such an ordinal document, such a probability that white or black dots occur in succession is very high and, therefore, a lump of signals representing successive dots of the same kind is transformed to a signal having a number of bits smaller than the sum of bits of individual original signals. Although data having a low probability of occurrence which is comprised of a relatively small number of dots is transformed to a signal having a larger number of bits inconveniently, the efficiency of data compression is much improved as a whole.

Recently, it is highly demanded to transmit documents including half tone images such as pictures and there have been proposed facsimile machines having a picture mode for transmitting half tone images faithfully.

Upon processing half tone images, according to a conventional method, for representing half tone images each picture element is represented by plural dots having a two-dimensional spread, for example in a matrix form and the density thereof is represented by a ratio of black and white dots contained therein.

In the known data compression method, there is a possibility such that the efficiency of data contraction may be decreased upon transmitting half tone images since they have a low probability of occurrence of successive dots of the same kind when compared with a usual document including characters mainly.

SUMMARY OF THE INVENTION

An essential object of the present invention is to provide a method for processing half tone images beforehand so as to be able to improve the efficiency of data compression.

Another object of the present invention is to provide a method enabling a data transmission machine such as a facsimile machine to compress half tone images efficiently.

One more object of the present invention is to provide a method for reconstructing half tone image data represented by two dimensional patterns to image data represented by one dimensional patterns which can be compressed at a high efficiency by a conventional data compression method.

A further object of the present invention is to provide a method being capable of compressing image data before performing the conventional data compression.

BRIEF DESCRIPTION OF THE DRAWINGS

These and other objects and features of the present invention will become clear from the following description taken in conjunction with the preferred embodiment thereof with reference to the accompanying drawings, in that;

FIG. 7 is a view for showing correspondency between each dot of the half tone image data and that of the reconstructed image data;

FIG. 14 shows a part of a half tone image data to be reconstructed in the second preferred embodiment of the present invention;

FIG. 15 shows the reconstructed image data obtained by transforming the half tone image data shown in FIG. 14;

FIG. 16 is a view for showing rules for interchanging image data of the reconstructed image data;

FIG. 17 shows the image data obtained by interchanging data of the reconstructed image data shown in FIG. 15;

FIG. 21 shows rules for smoothing the reconstructed data according to the third preferred embodiment of the present invention;

FIG. 22 shows an example of the reconstructed image data before executing the smoothing processing;

FIG. 23 shows the image data obtained in the third preferred embodiment by smoothing the reconstructed image data shown in FIG. 22;

DETAILED DESCRIPTION OF THE PREFERRED EMBODIMENT

Figure 1:
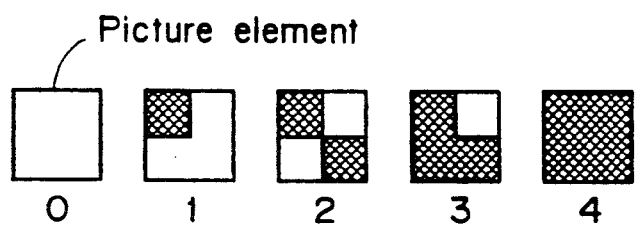
FIG. 1 shows picture elements represented by two dimensional density patterns.

It is to be noted that like reference numerals denote like elements through the detailed description.

First Preferred Embodiment

At first, a density pattern method for representing half tone images wherein each picture element is represented by 4 dots in a form of matrix of 2×2 is explained.

As shown in FIG. 1, the density of each picture element is represented by 4 dots in a form of (2×2) matrix. In other words, the number of black dots varies from 0 to 4 as the density increases in one picture element. Each black dot is indicated by a double hatched dot through all figures attached.

Figure 2:
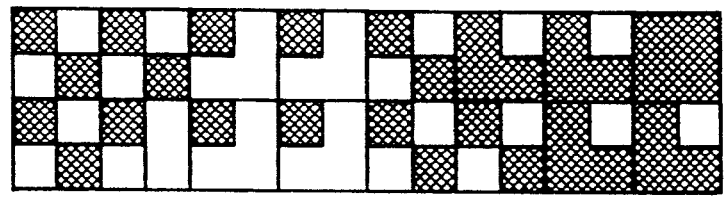
FIG. 2 shows a part of an image represented by two dimensional density patterns.

Accordingly, an image having been read by an image sensor is represented by a collection of density patterns as shown in FIG. 2 which shows a part of a half tone image.

If the half tone image data as shown in FIG. 2 are compressed using a conventional data compression method, for example MH method, some inconveniences are invited.

For example, with respect to the upper most and the third rows of the image data shown in FIG. 2, an inversion from black to white or vice versa is repeated at every dot. According to the conventional data compression method, the data of one white dot is transformed to a data having a length of six times that of the original data and the data of one black dot is transformed to a data having a length of three times that of the original data. As the result, the length of the data of the uppermost or the third row becomes 4.5 times the original data length and this contradicts the purpose of the data compression.

Figure 3:
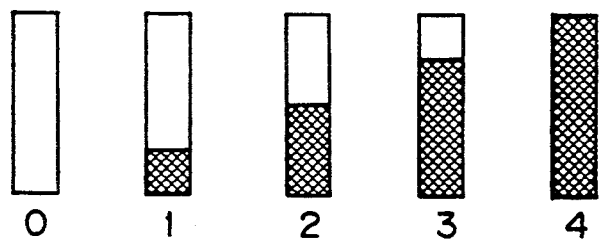
FIG. 3 shows one dimensional density patterns corresponding to respective two dimensional density patterns shown in FIG. 3.
Figure 4:
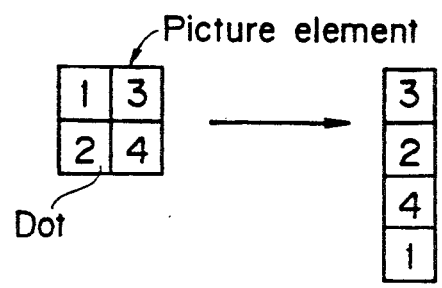
FIG. 4 is a view for showing correspondency between each dot of the two dimensional density pattern and each dot of the one dimensional density pattern.

According to the preferred embodiment of the present invention, each two-dimensional density pattern of 2×2 dot matrix is transformed into a one-dimensional density pattern of (4×1) dot matrix to improve the efficiency of the data compression regarding the half tone images, as shown in FIG. 3. In this transformation, positions of dots of the two-dimensional density pattern are assigned to those of the one-dimensional density pattern as shown in FIG. 4. According to this transformation, black dots are allotted so as to align successively from the bottom side of the column density pattern as the density increases, as shown in FIG. 3.

Figure 5:
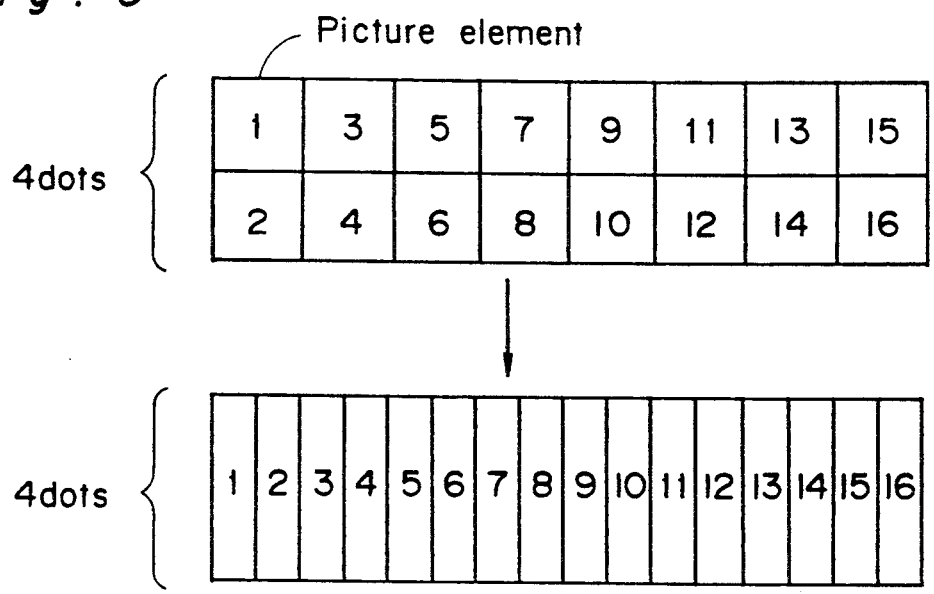
FIG. 5 is a view for showing a manner for aligning one dimensional density patterns transformed from respective picture elements aligned in two rows.

The one-dimensional density patterns thus transformed are aligned successively in a direction of the data compression (a direction of row), as shown in FIG. 5. Namely, every two rows of picture elements represented by 2×2 density patterns is rearranged so as to form a row of the one-dimensional density patterns in the direction of the data compression.

Figure 6:
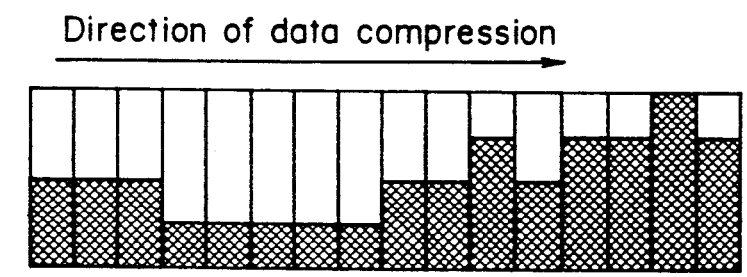
FIG. 6 shows a reconstructed image data which is obtained by transforming the half tone image data shown in FIG. 2.

FIG. 6 shows an example of the row of the one-dimensional density patterns obtained from the image data shown in FIG. 2. As is apparent from comparison of FIG. 6 with FIG. 2, a lot of dots of the same kind tend to align in the direction of the data compression by the transformation according to the present invention.

FIG. 7 shows a concrete manner of the reconstruction of the image data.

After the reconstruction of the image data, the data compression is performed with respect to every row comprised of dots aligning in the direction of the data compression using a known data compression method such as MH method. Thus, a high efficiency of the data compression is obtained.

To reproduce the original image data, one dimensional density patterns are retransformed to two dimensional density patterns reversely.

In the above example, every two rows of picture elements are rearranged to a row of one dimensional density patterns to keep the size of image constant.

However, it is also possible to rearrange every one row of picture elements represented by two dimensional density patterns. In this case, the image size is changed by the rearrangement. But this does not matter since the original image data can be reproduced at the receiving side.

As mentioned above, according to the present invention, half tone images are processed beforehand so as to be able to compress data efficiently and, thereby, the data compression can be made quite efficiently using a known data compression method.

Figure 8:
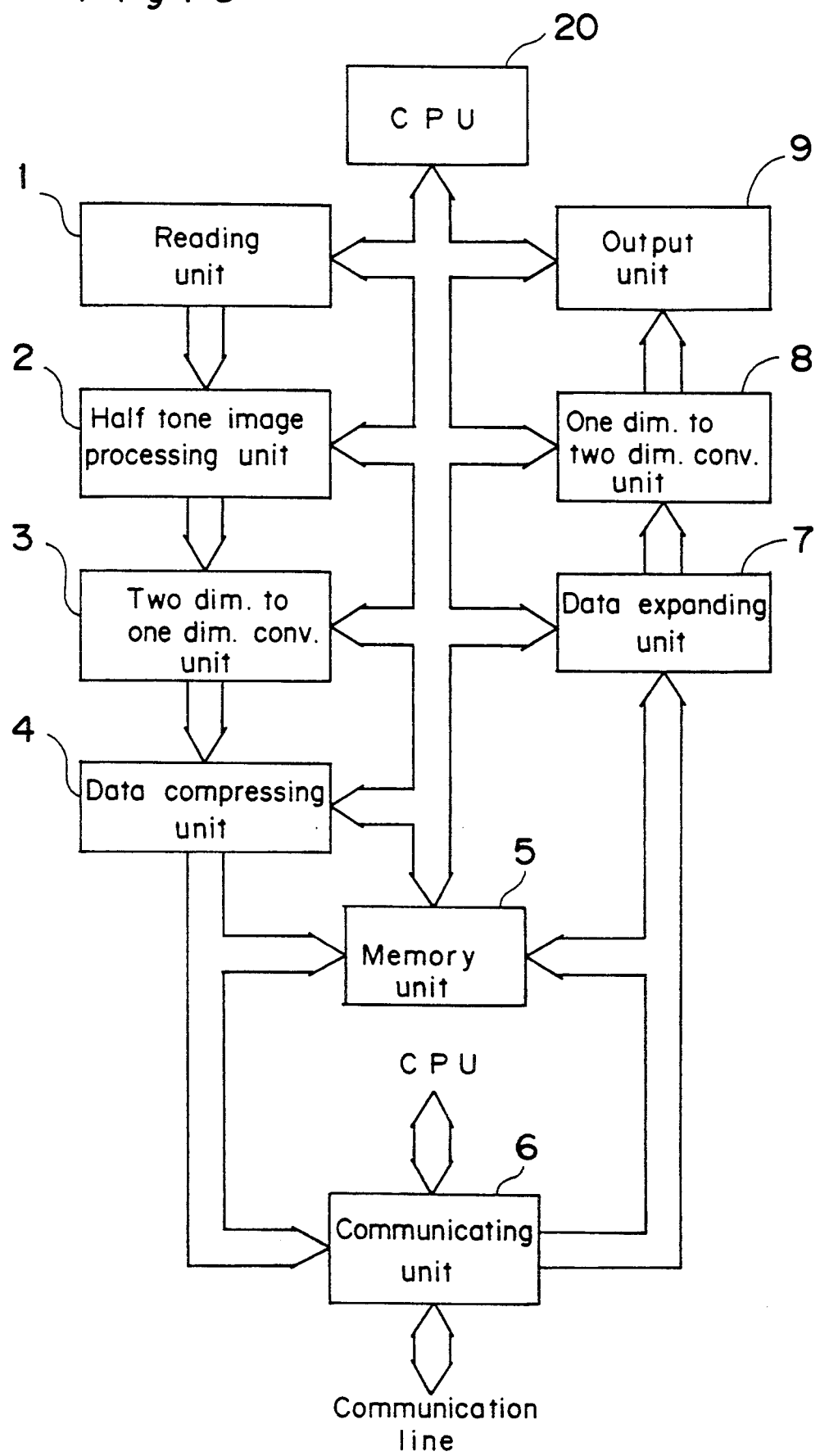
FIG. 8 is a block diagram of a facsimile machine to which the present invention is applied.

FIG. 8 shows a block diagram of a facsimile machine capable of performing the data compression according to the present invention.

The facsimile machine comprises a microcomputer 20 for controlling the machine as a whole, an image reading unit 1, a half tone processing unit 2, a two dimension to one dimension converting unit 3, a data compressing unit 4, a memory unit 5, a communication unit 6, a data expanding unit 7, a one-dimension to two-dimension converting unit 8 and an output unit 9.

In the image reading unit 1, each document is read in a unit of dot by an image sensor (not shown). The image sensor outputs analog signals corresponding to densities of individual dots. The analog signals outputted are converted to digital signals by an analog to digital converter (not shown). Each digital signal represents a density of each dot which is classified into five degrees from 0 to 4 in the present preferred embodiment. Namely, the density of each dot is represented by either of five codes from (000) to (101).

In the half tone processing unit 2, the digital signals are received from the image reading unit 1 and an average density of each picture element comprised of 4 dots in a form of matrix of $2 \times 2$, as shown in FIG. 1, is calculated from 4 digital signals reflecting respective densities of the corresponding 4 dots. Then, each density pattern in a form of matrix of $2 \times 2$ is assigned to each picture element based on the average density obtained. Namely, each picture element is represented by 4 dots in a form of a dot matrix of $2 \times 2$ and each dot is represented by one bit data which indicates black or white. The half tone image data represented by picture elements correspond to images to be printed out one to one.

The half tone image data are outputted to the two dimension to one dimension converting unit 4 in a unit of 8 dots successive in a direction of a row of the matrix of the density pattern.

The two dimension to one dimension converting unit 4 transforms the half tone image data inputted using the transformation method mentioned above. Namely, according to the present invention, each two dimensional density pattern in a form of matrix of $2 \times 2$ is transformed into a one dimensional density pattern in a form of column matrix of $4 \times 1$ and the half tone image data as shown in FIG. 2 is reconstructed to image data represented by one dimensional density patterns as shown in FIG. 6. The image data thus reconstructed are outputted in a unit of 8 dots successive in the direction of row to the data compressing unit 4.

In the data compressing unit 4, the image data inputted are converted to serial data and the serial data are compressed by assigning code data in response to respective numbers of successive black or white dots.

The compressed image data are stored in the memory unit 5, if necessary, and are transmitted through the communication unit 6.

Upon receiving the image data, the image data transmitted are stored in the memory unit 5, if necessary, and are expanded by the data expansion unit 7. The expanded image data are retransformed to the half tone image data by the one dimension to two dimension converting unit 8 and the output unit 9 outputs the half tone image according to the half tone image data sent from the one dimension to two dimension converting unit 8.

The facsimile machine according to the present invention is characterized in that it provides the two dimension to one dimension converting unit 3 and the one dimension to two dimension converting unit 8. Other units thereof such as the data compressing unit 3 and the data expanding unit 7 are substantially same as those of a conventional facsimile machine.

Figure 9:
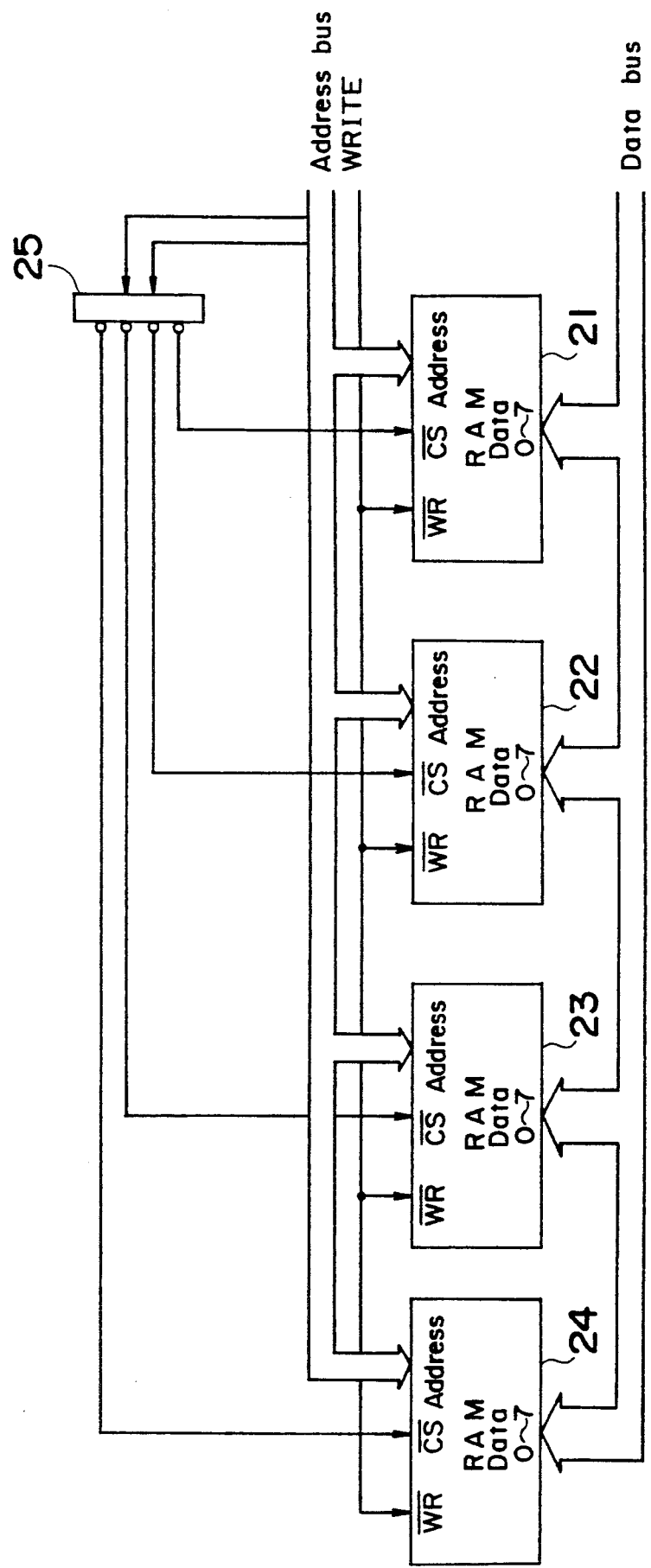
FIG. 9 is a block diagram of a data writing circuit used in a two dimension to one dimension converting unit of the facsimile machine.
Figure 10:
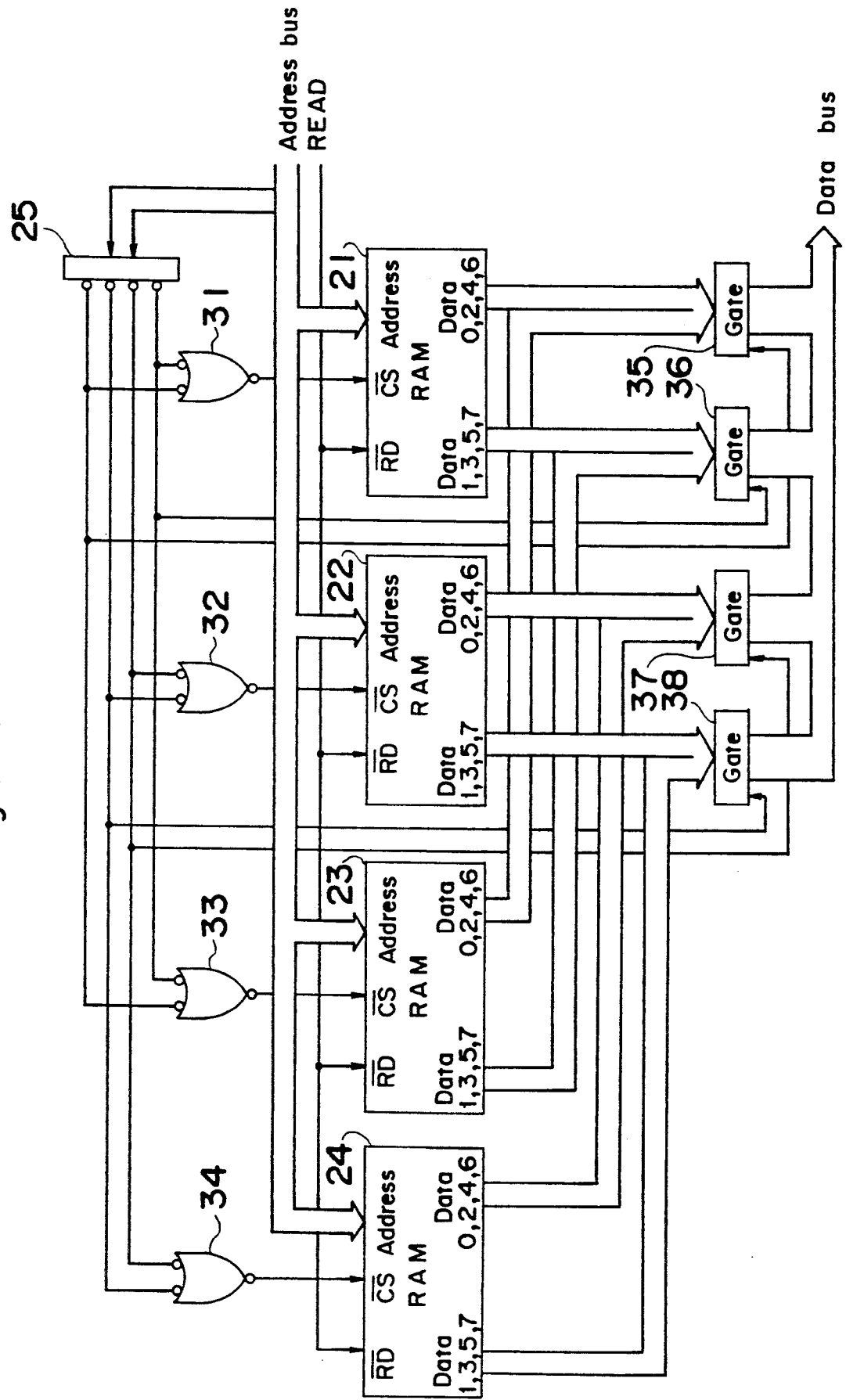
FIG. 10 is a block diagram of a data reading circuit for reading out data written by the data writing circuit which is used in the two dimension to one dimension converting unit.

Next, a composition of the two dimension to one dimension converting unit 3 is explained using FIGS. 9 and 10.

FIG. 9 shows a writing circuit of the two dimension to one dimension converting unit 3.

The writing circuit provides four RAMs 21, 22, 23 and 24 for memorizing first to fourth row data of the half tone image data. A data bus of the CPU 20 is connected to data ports of each RAM and transmits half tone image data from the half tone processing unit 2 in a unit of 8 bits. An address bus of the CPU is connected to address ports of each RAM to transmit memory identification data of 2 bits for selecting either of the first to the fourth RAMs 21 to 24 and address designation data of 10 bits for indicating respective addresses of the RAM selected. A WRITE signal is inputted to a $\overline{WR}$ port of each RAM. The signal of the address bus is decoded by a decoder 25 to generate a chip select signal. The chip select signal is inputted to each of $\overline{CS}$ ports of the four RAMs 21, 22, 23 and 24 to select either of them. The selected RAM stores the half tone image data of the corresponding row in a unit of 8 bits per one address designated. Thus, the first to fourth row data are memorized in the first to fourth RAMs 21 to 24, respectively.

The image data memorized in the first to fourth RAMs 21 to 24 are read out by a reading circuit shown in FIG. 10 to reconstruct them.

As is understood from FIG. 7, data of the first row of the reconstructed image data are comprised of data picked up from the data of the first and the third rows of the half tone image data.

Accordingly, if a signal inputted to the decoder 25 is decoded as a signal designating the first row, the decoder 25 outputs chip select signals, via negative logic OR gates 31 and 33, to $\overline{CS}$ ports of the first and the third RAMs 21 and 23 simultaneously. Thereby, data memorized in the first and the third RAMs 21 and 23 are read out at the same time in synchronization with READ signals from the CPU 20. Further, as is understood from FIGS. 6 and 7, the data of the first row of the reconstructed image data are constructed by rearranging odd numbered data of the first and the third rows of the half tone image data alternatively. Accordingly, odd numbered data of the first and the third rows of the half tone image data are outputted from data output ports (0, 2, 4, 6) to a tri-state gate 35 in the order of 0, 2, 4 and 6.

This tri-state gate 35 is enabled by the first row output signal from the decoder 25 and outputs thereof are outputted through the data bus. Thus, the first row data are reconstructed using odd numbered data of the first and the third rows of the half tone image data.

Similarly, the second row data are obtained using even numbered data of the second and the fourth rows of the half tone image data stored in the second and the fourth RAMs 22 and 24. Namely, upon reading out the image data, the second row select signals are inputted to $\overline{CS}$ ports of the second and the fourth RAMs 22 and 24 simultaneously to select them.

Further, only even numbered data of the second and the fourth rows of the half tone image data are outputted simultaneously from data output ports (1, 3, 5, 7) to a tri-state gate 38 enabled by the decoder 25.

Also, data reconstruction with respect to the third row is made using odd numbered data of the second and the fourth rows of the half tone image data stored in the second and the fourth RAMs 22 and 24. In this case, the second, the fourth RAMs 22, 24 and a tri-state gate 37 are selected to obtain the third row data. Further, the fourth row data are obtained by selecting the first and the third RAMs 21 and 24 and a tri-state gate 36. The fourth row data are constructed by even numbered data of the first and the third rows of the half tone image data.

Thus, the half tone image data are reconstructed to image data represented by one dimensional density patterns.

The one dimension to two dimension converting unit 8 to be used upon data expansion can be formed using the writing circuit of FIG. 9 and the reading circuit of FIG. 10 in a reversed manner.

In this preferred embodiment, circuits for reconstructing data of 8 bits are used since each 8 bits data is assigned to one address.

However, it is also possible to assign each data of one bit to one address of the RAM. In this case addresses are designated by the CPU 20 according to a predetermined order.

Figure 11:
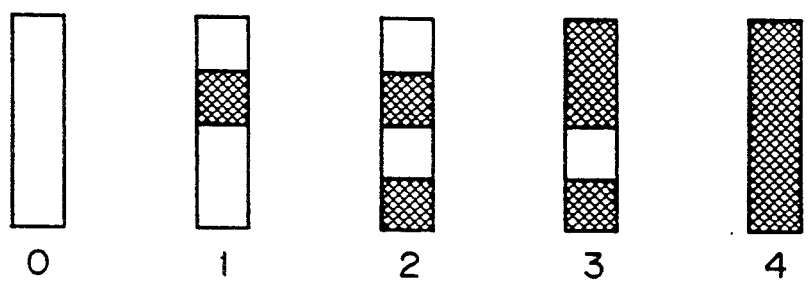
FIG. 11 shows another example of one dimensional density patterns employed in the variation of the first preferred embodiment of the present invention.
Figure 12:
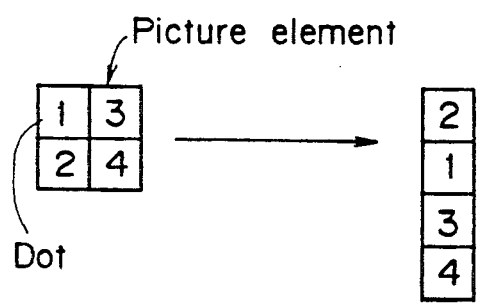
FIG. 12 is a view for showing correspondency between each dot of the two dimensional density pattern and that of the one dimensional density pattern shown in FIG. 11.

FIGS. 11 and 12 show a variation of the preferred embodiment.

As shown in FIG. 12, each two dimensional density pattern in a form of (2×2) matrix is transformed to a one dimensional density pattern in a form of (4×1) matrix. In this transformation, black dots are assigned so as to disperse in a direction of column of the matrix, as shown in FIG. 11.

Figure 13:
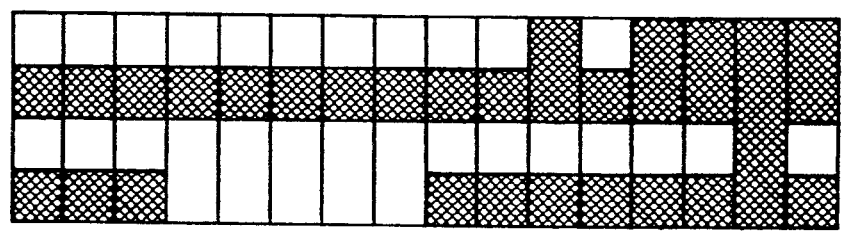
FIG. 13 shows a reconstructed image data which is obtained by transforming the half tone image data shown in FIG. 2 using the one dimensional patterns shown in FIG. 11.

FIG. 13 shows the image data obtained by transforming the half tone image data shown in FIG. 2 according to the transforming method shown in FIG. 12.

As is apparent from comparison of FIG. 13 with FIG. 6, black dots in the present variation are dispersed much more. Accordingly, if the reconstructed image data are outputted as they are, a relatively natural half tone image is reproduced when compared with the reconstructed image data of FIG. 6. In other words, the reconstructed image data can be reproduced without using the one dimension to two dimension converting unit 8. Accordingly, it is possible to obtain a relatively natural half tone image by a facsimile machine even if it does not provide the one dimension to two dimension converting unit 8.

Data reconstruction according to the transformation method mentioned above can be attained by altering the way for selecting the chip select signal and the gate control signal to be outputted from the decoder 25.

In the above referred embodiment, the image data having been read by the image reading unit are represented using the two dimensional density patterns at the half tone processing unit 2 and, then, each two dimensional density pattern is transformed to a one dimensional density pattern of (4×1) matrix at the two dimension to one dimension converting unit 3. However, from a view point to enhance the data compression efficiency, it is desirable to assign a one dimensional density pattern to each picture element directly according to digital signals from the image reading unit 1.

In this case, the two dimension to one dimension converting unit 3 can be omitted. However, the one dimension to two dimension converting unit 8 is still necessary to transform one dimensional density patterns to two dimensional density patterns to reproduce the half tone image.

In the preferred embodiment, the density pattern has a form of (2×2) matrix but, in general, the present invention is applicable to density pattern in a form of (N×N) matrix wherein N is an integer larger than 2. In this case, the two dimensional density pattern of (N×N) matrix is transformed to a one dimensional density pattern in a form of ($N^2$×1) matrix.

Further, the present invention is applicable to a density pattern in a form of a matrix of (N×M) wherein N≠M.

Also, the present invention is applicable to a method for reproducing half tone images using a dither matrix.

These modifications mentioned above are applicable to all of the preferred embodiments of the present invention to be explained hereinafter.

The Second Preferred Embodiment

In the second preferred embodiment, half tone image data represented by two dimensional density patterns in a form of (2×2) matrix as shown in FIG. 14 are transformed to image data represented by one dimensional density patterns in a form of (4×1) matrix, as shown in FIG. 15, according to the same transformation method as explained in the first preferred embodiment and, thereafter, the image data reconstructed are checked to find out isolated dots in a direction of row. If an isolated dot is found out, it is interchanged with an adjacent dot to get rid of an isolated dot.

Such interchange of data is performed according to predetermined rules as shown in FIG. 16. Data are checked in a unit of 8 dots.

When a pattern as shown at the left hand side of (a) of FIG. 16 is found out, the fourth black dot is interchanged with the fifth white dot, as shown at the right hand side thereof. If a dot pattern "00101" as shown at the left hand side of (b) of FIG. 16 is found out, the dot pattern is rearranged to another dot pattern "00011" irrespective to the position of the pattern. Such a dot pattern "00101" is shown in the second row of FIG. 15.

Further, in the case (c) of FIG. 16, if a dot pattern "1010" exists at the head side of the data in a unit of 8 dots, it is rearranged to another pattern "1100".

FIG. 17 shows the result of the interchange of data according to the rules defined in FIG. 16.

As is apparent from comparison of FIG. 17 with FIG. 15, isolated black and/or white dots are reduced effectively in the second preferred embodiment. This enhances the efficiency of data compression.

Figure 18:
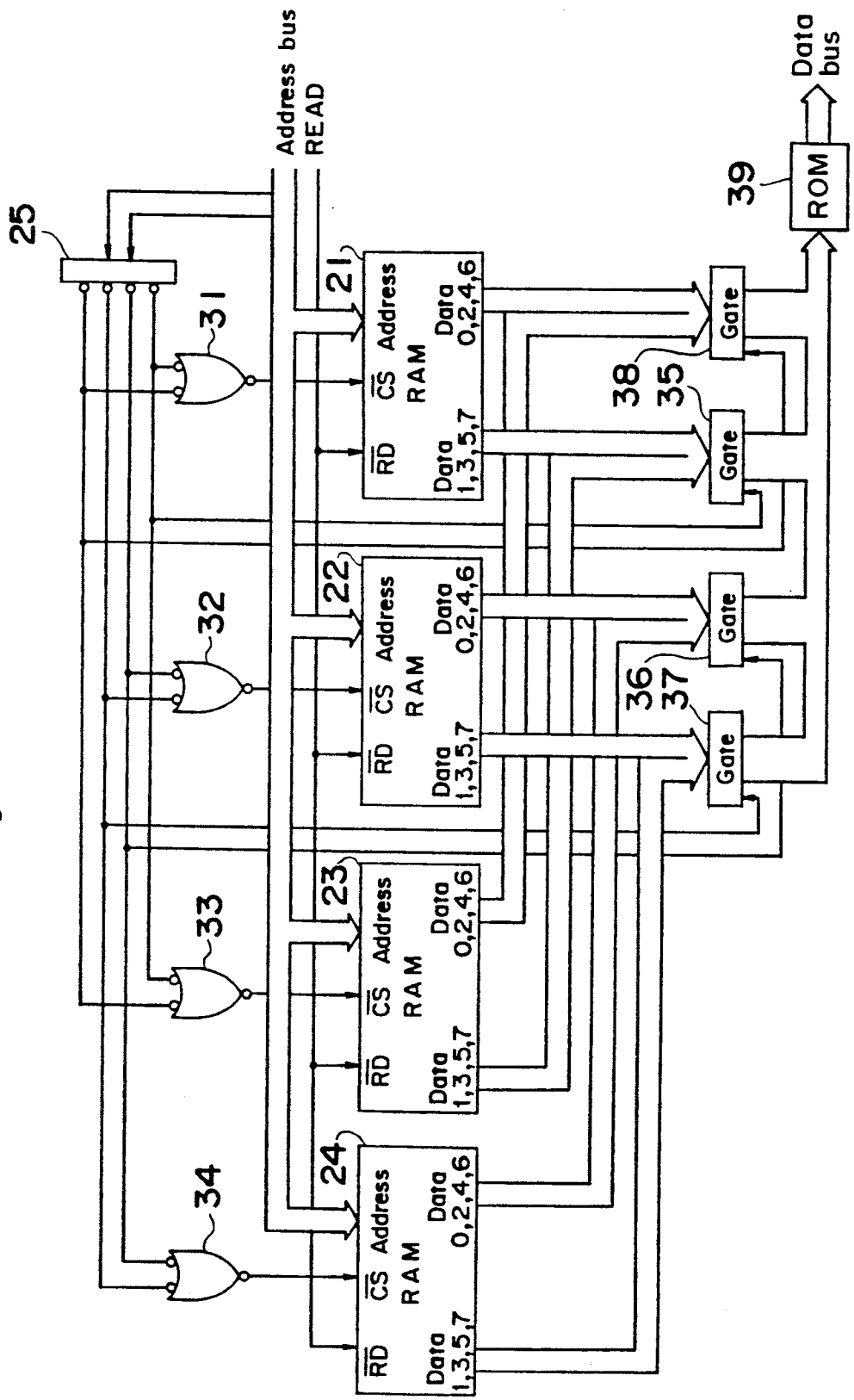
FIG. 18 is a block diagram of a data reading circuit to be used in the two dimension to one dimension converting unit of the facsimile machine.

FIG. 18 shows a reading circuit for performing the data transformation from two dimensional density patterns to one dimensional density patterns and the data interchange.

The reading circuit has a substantially same composition as that shown in FIG. 10 except for a ROM 39 which is connected on the way of the data bus connected to tri-state gates 35 to 38. Data outputted from respective tri-state gates 35 to 38 are inputted into an address port of the ROM 39 which memorizes patterns shown in FIG. 16. Every data unit of 8 bits is checked by the ROM 39 and, if it includes either of the patterns memorized, the data interchange is performed to get rid of an isolated black or white dot.

The writing circuit of the two dimension to one dimension converting unit 3 used in the first preferred embodiment can be used without any change in the second preferred embodiment.

Figure 19:
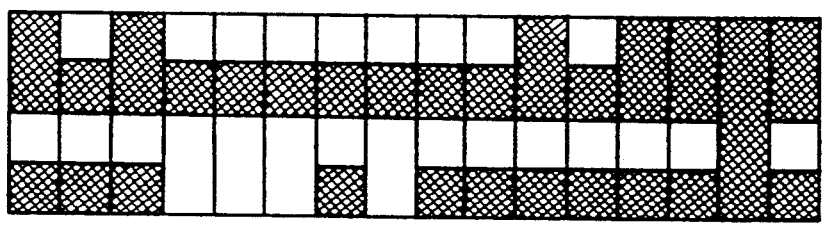
FIG. 19 shows the reconstructed image data obtained by transforming the half tone image data shown in FIG. 14 using the one dimensional density patterns shown in FIG. 11.

FIG. 19 shows reconstructed image data obtained by transforming the half tone image data shown in FIG. 14 according to the transformation method shown in FIGS. 11 and 12 relates to the variation of the first preferred embodiment.

Figure 20:
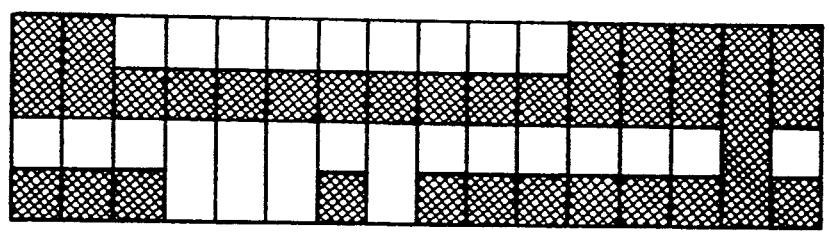
FIG. 20 shows the image data obtained by interchanging the reconstructed image data shown in FIG. 19 according to the rules employed in the second preferred embodiment.

FIG. 20 shows the image data obtained by interchanging dot data of the reconstructed image data shown in FIG. 19 according to the rules shown in FIG. 16.

The Third Preferred Embodiment

In the third preferred, reconstructed image data are subjected to a smoothing processing.

This smoothing processing is intended to improve the second preferred embodiment so as to enhance the efficiency of data compression much more. Namely, in the second preferred embodiment, some isolated dots still remain even after the interchange of reconstructed data, as shown in FIG. 17. According to the third preferred embodiment, other rules for removing isolated dots are introduced.

These rules are shown in FIG. 21. In this preferred embodiment, one row data in the direction of data compression is checked in a unit of successive 5 dots while shifting by one dot in the same direction. If either of 6 patterns shown at the left hand side of FIG. 21 is found out, it is replaced to either of patterns shown at the right hand side of FIG. 21 corresponding thereto. In other words, the noticed dot is checked while shifting by one dot whether or not it is an isolated dot with reference to every two dots locating before and after it.

It is determined as an isolated dot provided that 3 or 4 dots locating before and after it are white or black, it is replaced to black or white so as to remove the isolated dot. Upon checking the top dot or the bottom dot of one line data, two white dots are added before the top dot or after the bottom dot.

FIG. 23 shows an example of the image data obtained by smoothing the reconstructed image data as shown in FIG. 22 according to the rules as shown in FIG. 21. For instance, an isolated black dot of the first row of FIG. 22 reconstructed image data is replaced to white one since the dot pattern including the isolated black dot as the noticed dot corresponds to the pattern "00100". the top black dot of the second row is replaced to a white dot since the dot pattern obtained by adding two white dots before the top dot as the notice dot corresponds to the pattern "00101". However, the second white dot of the second row is not replaced to a black one since the dot pattern including the second white dot as the noticed dot does not correspond to the pattern "01011". The third black dot of the second row is replaced to a white one since the dot pattern of this case corresponds to the pattern "10100". Thus, by repeating the smoothing processing with respect to respective dots of the reconstructed image data, such a smoothed image data as shown in FIG. 23 is obtained.

Figure 25:
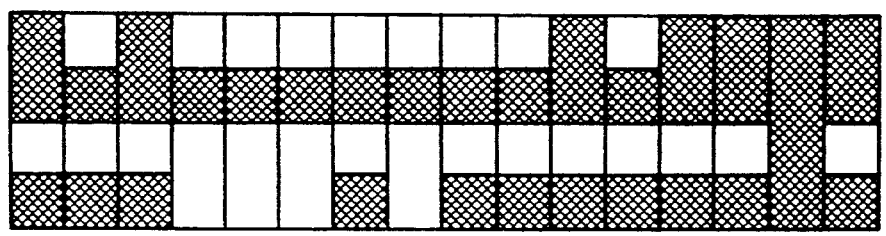
FIG. 25 shows the reconstructed image data obtained by transforming the half tone image data corresponding to the reconstructed image data shown in FIG. 22 using the one dimensional density patterns shown in FIG. 11.
Figure 26:
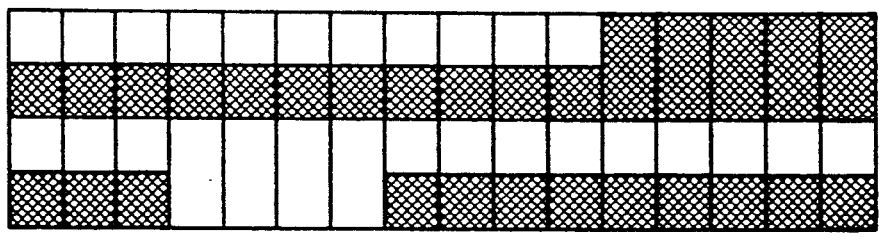
FIG. 26 shows the smoothed image data obtained by smoothing the reconstructed image data shown in FIG. 25.

FIG. 25 shows an example of the image data reconstructed according to the transformation method employed in the variation of the first preferred embodiment. This reconstructed image data are smoothed as shown in FIG. 26 according to the rules mentioned above.

Figure 24:
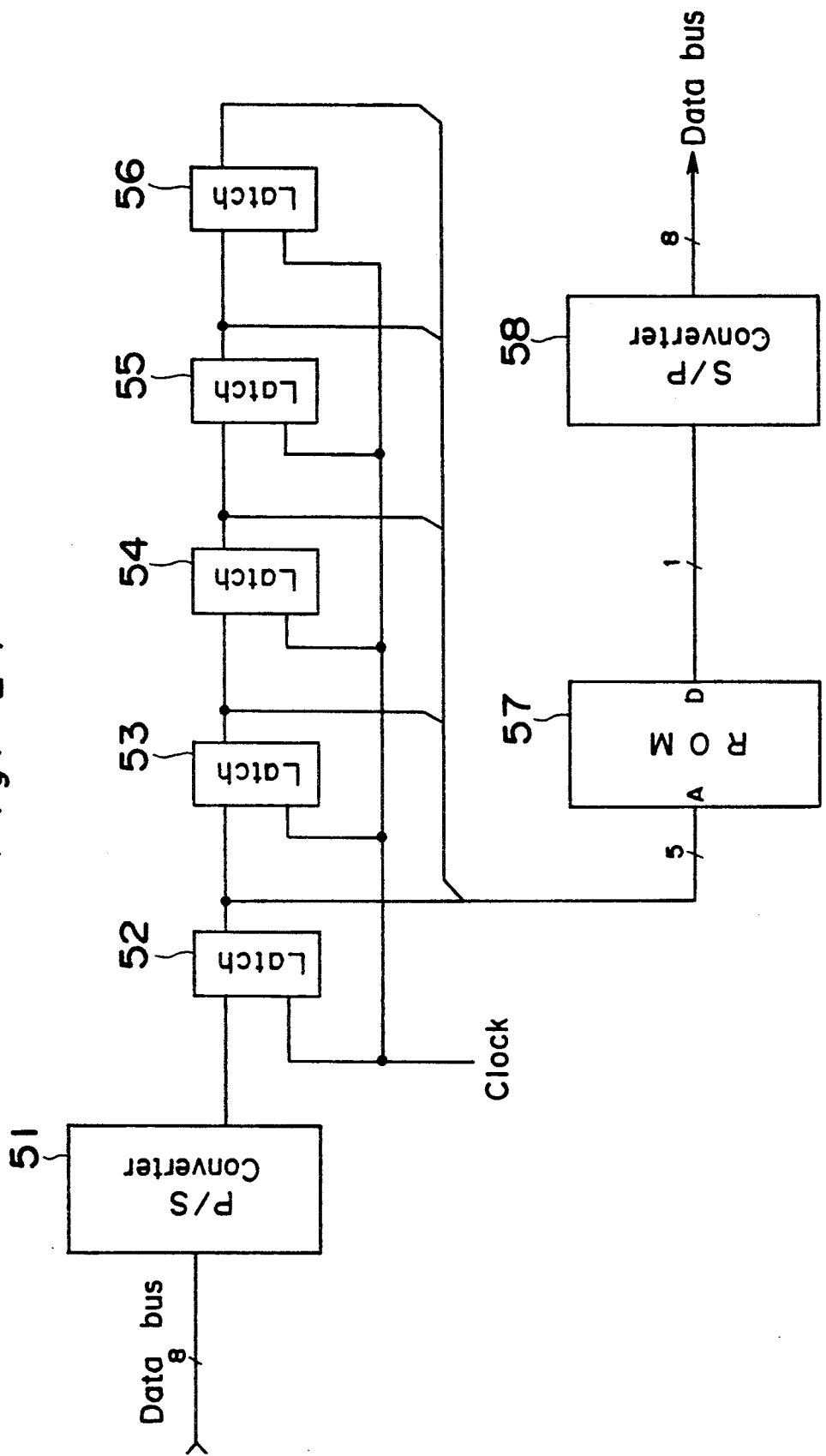
FIG. 24 is a block diagram of a smoothing circuit for smoothing image data which is connected to the data reading circuit of the two dimension to one dimension converting unit of the facsimile machine.

The writing and reading circuits used in the first preferred embodiment are also available as those of the third preferred embodiment. However, to execute the smoothing processing image data outputted from the reading circuit are inputted to a smoothing circuit as shown in FIG. 24.

Image data of 8 bits read out from the reading circuit are converted from parallel data to serial data by a parallel to serial converter 51 at first. The serial data converted are latched by five latches 52 to 56 sequentially in synchronize with clock signals applied from the CPU. Before the top dot of the row and after the bottom dot thereof, two white dots "00" are added by the CPU. The data latched by the latches 52 to 56 are sent to an address port of a ROM 57. In the ROM 57, 6 patterns as shown at the left hand side of FIG. 21 are memorized and, if a dot pattern of 5 dots corresponds to either of 6 patterns, the noticed dot is replaced to a dot of different kind, as shown at the right hand side of FIG. 21. Data subjected to the smoothing processing are sent to a serial to parallel converter 58 to convert them to serial data of 8 bits. The serial data of 8 bits are sent to the data compressing unit 4.

The Fourth Preferred Embodiment

Figure 27:
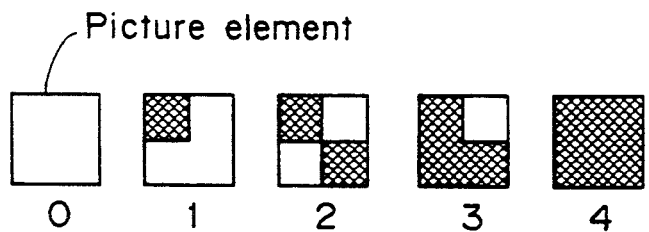
FIG. 27 shows picture elements represented by two dimensional density patterns.
Figure 28:
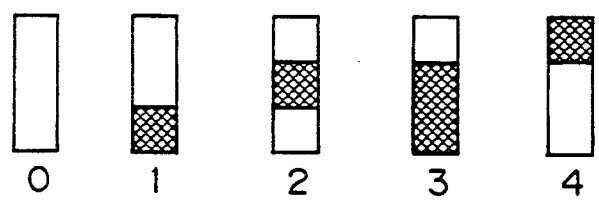
FIG. 28 shows one dimensional patterns in a form of (3×1) matrix which correspond to the two dimensional density patterns shown in FIG. 27.
Figure 29:
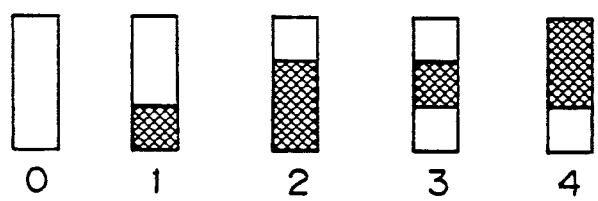
FIG. 29 shows another example of one dimensional patterns used in the fourth preferred embodiment of the present invention.

In the fourth preferred embodiment, five density patterns in a form of $(2 \times 2)$ matrix as shown in FIG. 27 are transformed to one dimensional density patterns in a form of $(3 \times 1)$ matrix as shown in FIG. 28 or FIG. 29. In this case, five densities are represented by binary codes of three bits. Namely, the target of data compression is not the two dimensional density pattern itself but the binary code of three bits. In the case of FIG. 29, so called alternating binary code is used. Thereby, the volume of data to be compressed is reduced to three quarters of that of the original density data. Generally speaking, two dimensional dot patterns of $(N^2+1)$ can be represented by binary codes of $(N+1)$ bits as far as an integer N is not so large.

Accordingly, the volume of data to be compressed is reduced by a ratio of $(N+1)/N^2$.

According to the fourth preferred embodiment mentioned above, each data of $(N+1)$ bits is further represented by a one dimensional density pattern in a form of a column matrix of $(N+1) \times 1$.

Figure 30:
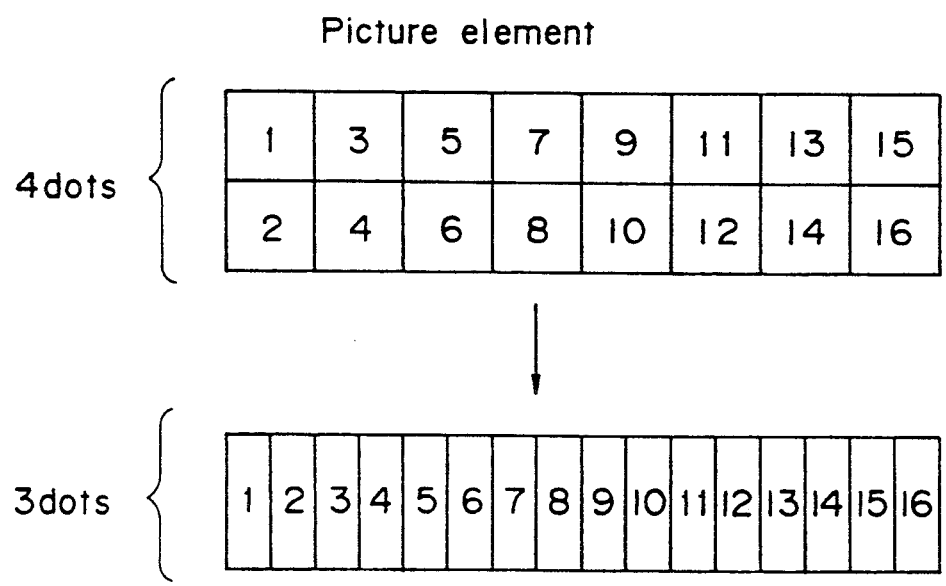
FIG. 30 is a view for showing correspondency between each of two dimensional picture elements and each of one dimensional patterns upon reconstruction of the half tone image data.

Thereafter, one dimensional density patterns thus obtained are aligned serially in a direction of row with respect to image data of two rows including odd and even numbered picture elements, as shown schematically in FIG. 30.

Figure 31:
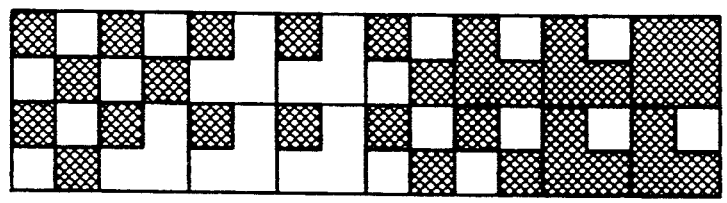
FIG. 31 shows a part of a half tone image data to be reconstructed according to the fourth referred embodiment.

FIG. 31 shows an example of image data represented by density patterns in a form of $(2 \times 2)$ matrix.

Figure 32:
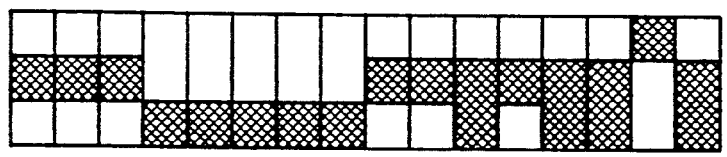
FIG. 32 shows the image data reconstructed from the image data shown in FIG. 31 using one dimensional patterns shown in FIG. 28.
Figure 33:
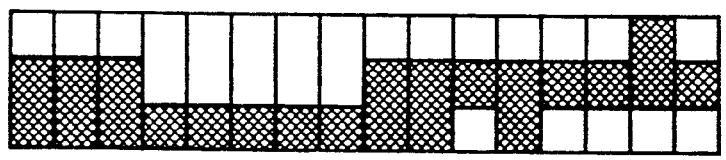
FIG. 33 shows the image data reconstructed from the image data shown in FIG. 31 using one dimensional patterns shown in FIG. 29.

FIG. 32 shows the image data reconstructed using one dimensional density patterns according to the transformation method as indicated by FIG. 28 and FIG. 33 shows the image data according to the transformation method as indicated by FIG. 29.

As is apparent from comparison of FIGS. 32 and 33 with FIG. 31, a rate of repetition of black and white dots is reduced reasonably in the reconstructed image data. Further, in comparison of FIG. 33 with FIG. 32, the former is more advantageous than the latter since lengths of successive black or white dots in the former become longer than those in the latter.

This is due to the merit of the alternating binary code since densities of respective picture elements are apt to vary continuously in an usual half tone image.

To realize the fourth preferred embodiment in a facsimile machine, it has a composition substantially same as that shown in FIG. 8 except for the reading circuit of the two dimension to one dimension converting unit.

Figure 34:
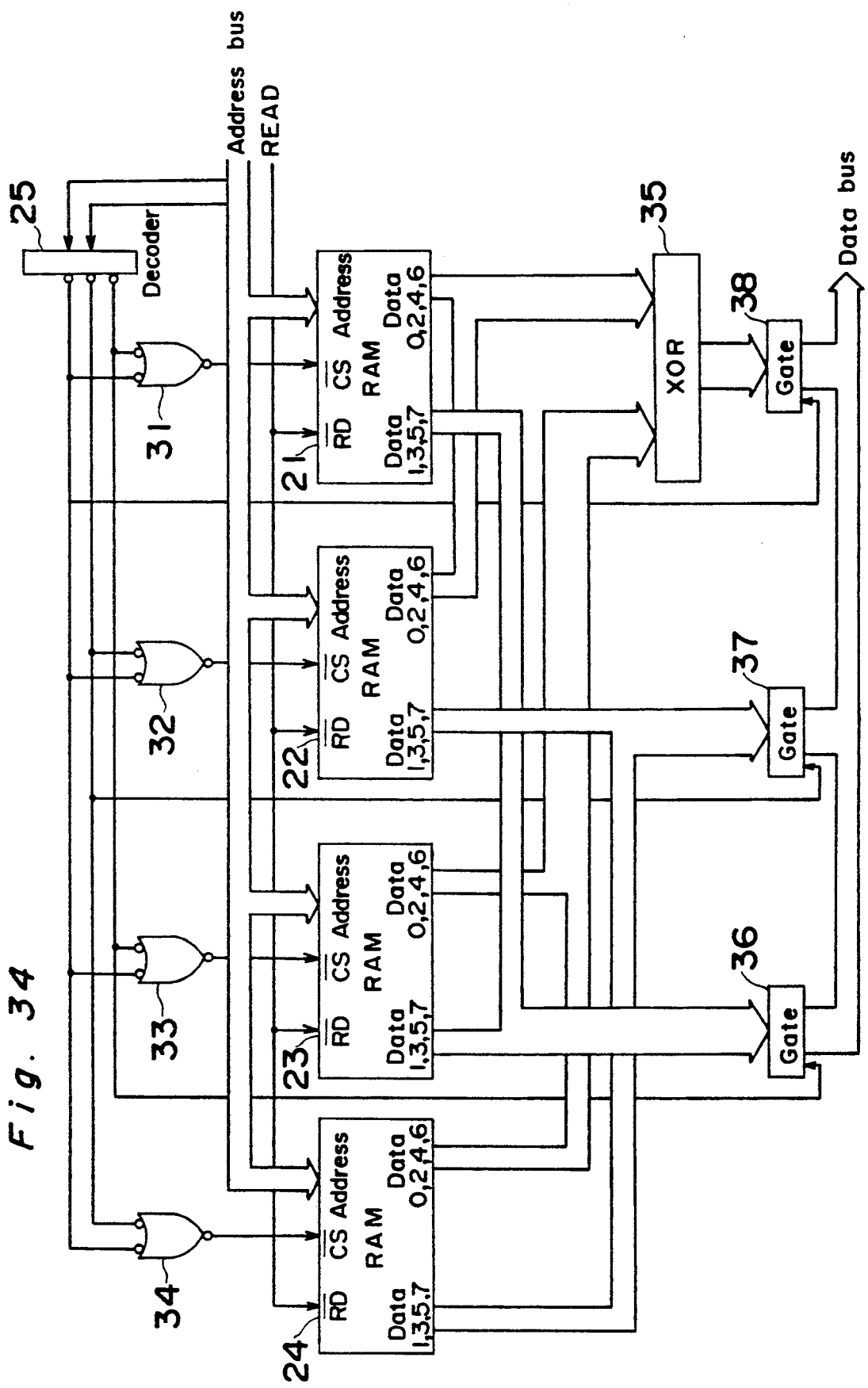
FIG. 34 is a block diagram of a data reading circuit to be used in the two dimension to one dimension converting unit of the facsimile machine according to the present invention.

FIG. 34 shows a reading circuit for reconstructing the image data written in the writing circuit shown in FIG. 9 according to the transforming method shown in FIG. 29.

Before entering into a detailed explanation of the reading circuit, the principle of data transformation using the alternating binary code is explained.

Figure 35:
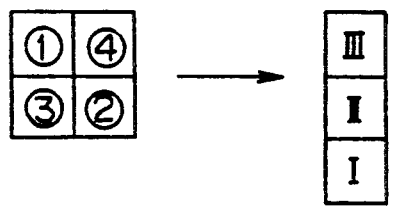
FIG. 35 is a view for showing correspondency between respective data of the two dimensional density pattern and respective data of the one dimensional pattern.

Assuming that dot data of the two dimensional density pattern are represented by Roman numerals ① to ④ and those of the one dimensional density pattern are represented by Greek numerals I to III as indicate in FIG. 35, the following relations are obtained among them when FIG. 27 and FIG. 29 are taken into consideration.

$I = ① \veebar ③$
(Namely, if $① \neq ③$, $I = 1$, and if $① = ③$, $I = 0$.)
$II = ②$
$III = ④$ The reading circuit realizes such relations upon reading out the image data written in the writing circuit shown in FIG. 9.

Figure 36:
FIG. 36 is a view for showing correspondency between the half tone image data and the reconstructed image data when employed one dimensional patterns shown in FIG. 29.

FIG. 36 shows the above relations more concretely.

According to FIG. 36, the first row of the reconstructed image data is obtained by aligning dot data identified by odd numbered rows (i.e. The first and the third rows) and each of even numbered columns alternatively in such a manner as of 01→21→03→23→05→25 and so on. Similarly, the second row thereof is obtained by aligning dot data identified by even numbered rows (i.e. The second and the fourth rows) and each of even numbered columns alternatively in such a manner as of 11→31→13→33→15→35 and so on.

With respect to the third row thereof, individual dot data are obtained by a little bit different manner as indicated by the relation I=①⊻③.

More concretely, the first dot data of the third row is obtained as an exclusive OR (00 ⊻ 10) of dot data identified by the first and the second rows and the first column and the second dot data is obtained as an exclusive OR (20⊻30) of dot data identified by the third and the fourth rows and the firs column. As is understood from the above, the third row is obtained by taking exclusive ORs of tow dot data identified by every two rows and one of odd numbered columns and by aligning them alternatively.

Returning to FIG. 34, a decoder 25 outputs signals for designating first to third rows of the reconstructed image data to be made.

If the signal outputted from the decoder 25 is a signal designating the third row, it is applied, via negative logic OR gates 31 to 34, to chip select ports $\overline{CS}$ of all RAMs 21 to 24 wherein the first to the fourth row data of the image data represented by the two dimensional density patterns are stored, respectively.

Thereby, data stored in individual RAMs 21 to 24 are simultaneously read out responsive to READ signals from the CPU. In this case, data are outputted from data output ports 0, 2, 4, 6, of each RAM and the data (00,02,04, ... ) of the first RAM 21 and the data (10, 12, 14, ... ) of the second RAM 22 are inputted to one side of an exclusive OR circuit 35 at the same time. Also, the data (20, 22, 24, ... ) of the third RAM 23 and the data (30, 32, 34, ... ) of the fourth RAM 24 are inputted to another side of the exclusive ORs 00⊻10, 20⊻30, 02⊻12, 22⊻32 and so on sequentially and outputs them to a data bus through a gate 38 selected by the signal designating the third row. Thus, the third row data are obtained.

As stated above, the second row data are obtained by aligning data identified by the second and the fourth rows and each of the even numbered columns of the half tone image data to be reconstructed alternatively.

Therefore, the second and the fourth RAMs 22 and 24 are selected simultaneously when the decoder 25 outputs the signal designating the second row. In this case, data are outputted from data ports 1, 3, 5, 7 of each of the second and the fourth RAMs 22 and 24 and outputted data are inputted to a tri-state gate 37 selected by the signal from the decoder 25. The tri-state gate 37 outputs the even numbered data of the second row and the even numbered data of the fourth row alternatively. Thus, the second row data are obtained.

Upon forming the first row, the first and the third RAMs 21 and 23 are selected. In this case, data are read out from the ports 1, 3, 5, 7 of each RAM and are inputted to a tri-state gate 36 selected by the decoder 25. The tri-state gate 36 outputs the even numbered data of the first row and the even numbered data of the third row alternatively. Thus, the first row data 01, 21, 01, 23 ... are obtained.

Next, a manner for retransforming the one dimensional reconstructed image data to the two dimensional half tone image data is explained.

Received data are expanded at the data expanding unit 6 of the facsimile machine at first and then, expanded data are outputted to the one dimension to two dimension converting unit 7.

Figure 37:
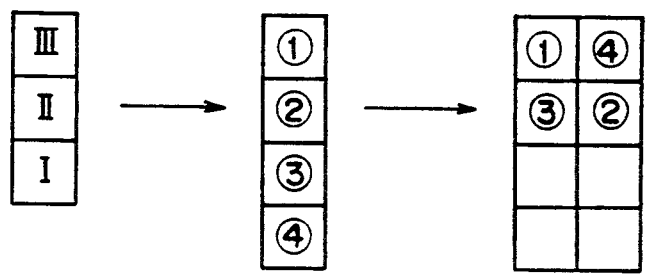
FIG. 37 is a view showing a manner for retransforming the one dimensional pattern to the two dimensional density pattern.

In the retransformation from the reconstructed image data to the half tone image data, patterns in a form of $(3 \times 1)$ matrix are transformed back to density patterns in a form of $(2 \times 2)$ matrix. Upon the retransformation, as shown in FIG. 37, the pattern in a form of $(3 \times 1)$ matrix is transformed to a pattern in a form of $(4 \times 1)$ matrix at first and individual data ① to ④ of the latter pattern of $(4 \times 1)$ matrix are rearranged to form a two dimensional density pattern (a picture element) of $(2 \times 2)$ matrix.

Respective elements ①, ②, ③, and ④ of the pattern in a form of $(4 \times 1)$ matrix are represented by elements I, II and III of the pattern in a form of $(3 \times 1)$ matrix as follows.

① = I V II

② = II

③ = Ī∧II

④ = III wherein V means logical OR and Λ means logical AND.

Figure 38:
FIG. 38 is a view for showing correspondency between the reconstructed image data and the half tone image data to be retransformed.

FIG. 38 shows a relation between the reconstructed image data and the half tone image data to be obtained.

Figure 39:
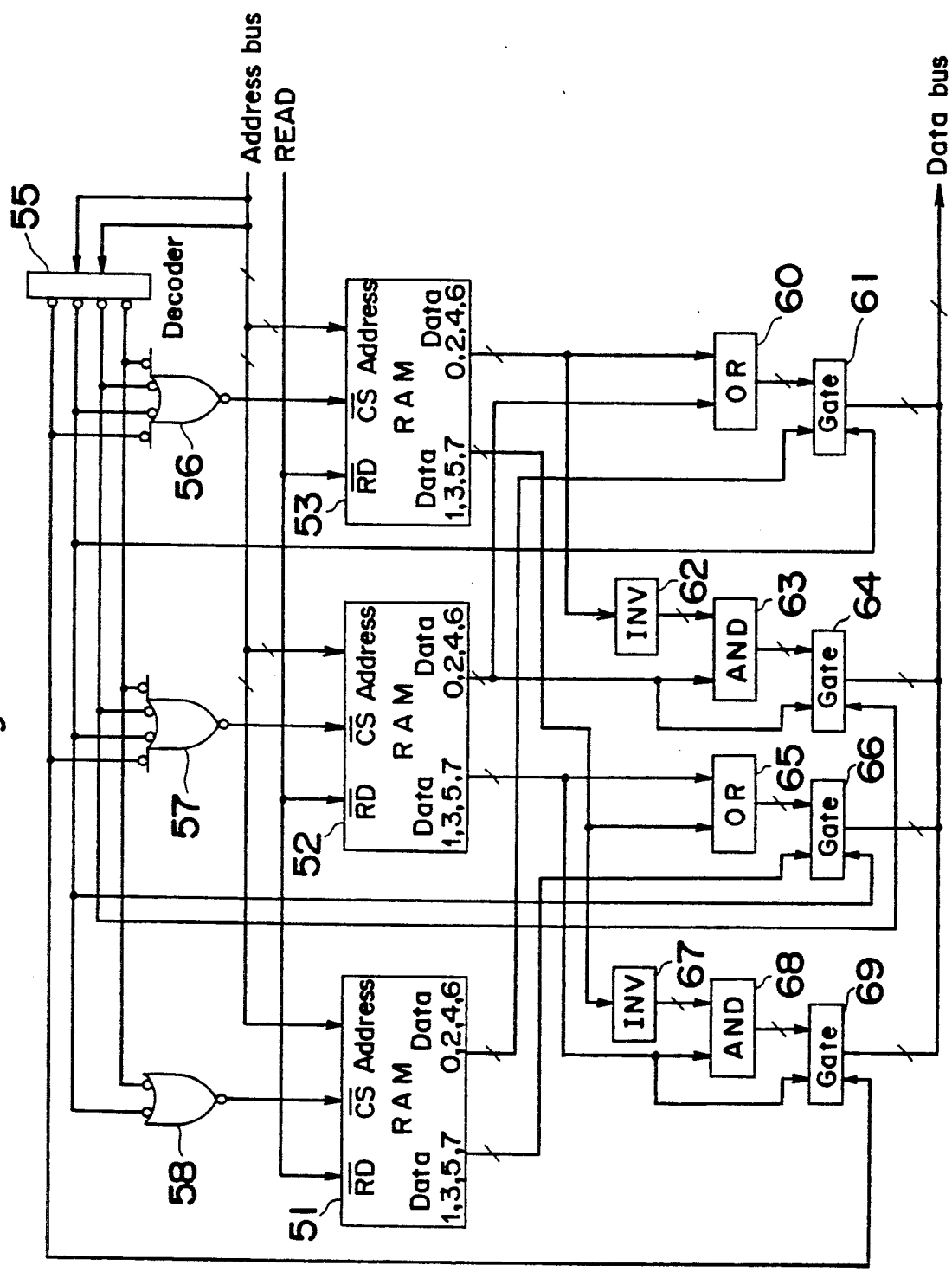
FIG. 39 is a block diagram of a data reading circuit for retransforming the reconstructed image data to the half tone image data according to the manner shown in FIG. 38.

FIG. 39 shows a composition of a data processing circuit in the one dimension to two dimension converting circuit.

The first to the third row data of the reconstructed image data are written into first to third RAMs 51, 52 and 53 by a writing circuit (not shown) similar to the writing circuit of the first preferred embodiment.

In FIG. 39, each of OR circuits 60 and 65 is comprised of 8 OR gates arranged in parallel to each other, each of INV circuits 62 and 67 is comprised of 8 inverters arranged in parallel to each other and each of AND circuits 63 and 68 is comprised of 8 AND gates arranged in parallel to each other.

Upon forming the first row data of the half tone image data to be obtained, the first to the third RAMs are selected, via NAND gates 58, 57 and 56, by a decoder 55. In this case, data are read out from data output ports 0, 2, 4, 6 of each RAM. The OR circuit 60 takes a lo9ical AND of each odd numbered data (20, 22, 24, . . . ) of the third row and each odd numbered data (10, 12, 14, . . . ) of the second row. The result is outputted to a tri-state gate 61 selected by the decoder 25 together with the odd numbered data (00, 02, 04, . . . ) of the first row.

The tri-state gate 61 outputs inputted data sequentially after rearranging them alternatively. Thus, the first row of the half tone image data is obtained.

Upon forming the second row data of the half tone image data, the third and the second RAMs 53 and 52 are selected by the decoder 25. In this case, data are read out from data output ports 0, 2, 4, 6 of each RAM. Each of the data from the third RAM 53 is logically inverted by the INV circuit 62 and, then, inputted to the AND circuit 63 together with the data read out from the second RAM 52. Namely, the AND circuit 63 takes a logical AND of each inverted odd numbered data of the third row and each odd numbered data of the second row. The result and each odd numbered data of the second row are rearranged as shown in FIG. 38 by a tri-state gate 64 selected by the decoder 25. The second row is obtained by repeating the above process.

With respect to the third row of the half tone image data, data read out from data output ports 1, 3, 5, 7 of the third RAM 53 and the second RAM 52 are used. Namely, an logical OR of each even numbered data of the third row of the reconstructed image data and each even numbered data of the second row thereof is taken by the OR circuit 65 and the result of the logical OR is inputted to a tri-state gate 66 together with each even numbered data of the first row read out from the data output ports (1, 3, 5, 7) of the first RAM 51 in order to rearrange them as shown in FIG. 38.

The third row of the half tone image data is obtained by repeating the above processing.

Upon forming the fourth row of the half tone image data, each even numbered data of the third RAM 53 read out from the data output ports (1, 3, 5, 7) is logically inverted by the INV circuit 67 and, then, inputted to the AND circuit 68. The AND circuit 68 takes a logical AND of each inverted data and each even numbered data of the second row.

The result of the logical AND and each even numbered data of the second row are rearranged as shown in FIG. 38 to output from a tri-state gate 69 selected by the decoder 25. By repeating the above process, the fourth row of the half tone image data is obtained.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. Method for processing image data being comprised of plural picture elements comprising,
   step for representing each picture element by a first matrix pattern of M rows and N columns in which the density of each picture element is represented by a ratio of a number of dots in a first color contained in said first matrix pattern to a number of dots in a second color contained therein,
   step for transforming said first matrix pattern to a second matrix pattern of (M×N) rows and one column,
   step for aligning said second matrix patterns in a direction of row in an order predetermined in relation to the order of the picture elements, and
   step for compressing image data comprised of said second matrix patterns aligned.

2. The method as claimed in claim 1 wherein M is equal to N.

3. Method for processing image data being comprised of plural picture elements comprising,
   step for representing each picture element by a first matrix pattern of M rows and N columns in which the density of each picture element is represented by a ratio of a number of dots in a first color contained in said first matrix pattern to a number of dots in a second color contained therein,
   step for transforming said first matrix pattern to a second matrix pattern being a column matrix,
   step for aligning said second matrix patterns in a direction of row in an order predetermined in relation to the order of the picture elements,
   step for rearranging dots aligning in the direction of row of image data comprised of said second matrix patterns if the arrangement of dots of a predetermined number coincides with any one of predetermined patterns, and
   step for compressing said image data after the rearrangement of dots.

4. The method as claimed in claim 3 wherein said second matrix pattern is a column matrix of (M×N) rows and one column.

5. The method as claimed in claim 3 wherein said first matrix pattern is regular matrix of N rows and N columns and said second matrix pattern is a column matrix of $N^2$ rows and one column.

6. Method for processing image data being comprised of plural picture elements comprising,
   step for representing each picture element by a first matrix pattern of M rows and N columns in which the density of each picture element is represented by a ratio of a number of dots in a first color contained in said first matrix pattern to a number of dots in a second color contained therein, step for transforming said first matrix pattern to a second matrix pattern being a column matrix, step for aligning said second matrix patterns in a direction of row in an order predetermined in relation to the order of the picture elements, step for checking image data comprised of said second matrix patterns in the direction of each row thereof to decide whether or not a block comprised of a predetermined number of dots successive in the direction of row coincides with any one of predetermined dot arrangement patterns, step for replacing a block comprised of a predetermined number of dots successive in a direction of row of image data comprised of said second matrix patterns with one of predetermined blocks if a block comprised of a predetermined number of dots successive in a direction of row of image data comprised of said second matrix patterns coincides with one of said predetermined dot arrangement patterns, and step for compressing said image data after the replacement of the block.

7. The method as claimed in claim 6 wherein said second matrix pattern is a column matrix of $(M \times N)$ rows and one column.

8. The method as claimed in claim 6 wherein first matrix patterns is a regular matrix of N rows and N columns and said second matrix pattern is a column matrix of $N^2$ rows and one column.

9. Method for processing image data being comprised of plural picture elements comprising, step for representing each picture element by a first matrix pattern of M rows and N columns in which the density of each picture element is represented by a ratio of a number of dots in a first color contained in said first matrix pattern to a number of dots in a second color contained therein, step for transforming said first matrix pattern to a second matrix pattern of L rows and one column wherein L is smaller than $(M \times N)$, step for aligning said second matrix patterns in a direction of row in an order predetermined in relation to the order of the picture elements, and step for compressing image data comprised of said second matrix patterns aligned.

10. The method as claimed in claim 9 wherein the density of each picture element is represented by a binary code in said second matrix pattern.

11. The method as claimed in claim 9 wherein the density of each picture element is represented by an alternating binary code in said second matrix pattern.

12. The method as claimed in claim 9 wherein said first matrix pattern is a regular matrix of N rows and N columns and said second matrix pattern is a column matrix of $(N+1)$ rows and one column.

13. Method for processing image data comprising step for transforming first matrix patterns in a form of matrix of $(M \times N)$ rows and one column representing densities of respective picture elements to second matrix patterns in a form of a matrix of M rows and N columns, in each of said second matrix patterns the density of each picture element being represented by a ratio of a number of dots in a first color contained in said second matrix pattern to a number of dots in a second color contained therein, and step for arranging said second matrix patterns in an order predetermined in relation to the order of series of picture elements.

14. The method as claimed in claim 13 wherein said first matrix pattern is a column matrix of $N^2$ rows and one column and said second matrix pattern is a regular matrix of N rows and N columns.

15. Method for processing image data comprised of plural picture elements comprising, step for representing the density of each picture element using data in a form of a matrix of M rows and one column, step for aligning plural said data in a direction of row in an order predetermined in relation to the order of series of picture elements, and step for compressing image data comprised of said data aligned in the direction of row.

16. Data compression method comprising step for representing each of picture elements of an image by a dot pattern including plural dots arranged so as to have a two-dimensional spread corresponding to the density of said each picture element, step for transforming said dot pattern to a one-dimensional dot pattern, step for aligning said one-dimensional dot patterns in a predetermined order, and step for performing data compression with respect to the image data represented by said one dimensional dot patterns.

17. The data compression method as claimed in claim 16 wherein said one-dimensional dot pattern is represented by a binary code.

18. Data compression method comprising, step for representing each of picture elements of an image by a dot pattern including plural dots arranged so as to have a two-dimensional spread corresponding to the density of said each picture element, step for transforming said dot pattern to a one-dimensional dot pattern, step for aligning said one-dimensional dot patterns in a predetermined order, step for checking said one-dimensional dot patterns aligned to find out an isolated dot in each block comprised of dots of a predetermined number being successive in a direction of data compression, step for rearranging said one-dimensional density patterns related to the block having an isolated dot therein so as for the isolated dot to disappear, and step for performing data compression with respect to the image data obtained by the above step.

19. Data compression method comprising, step for representing each of picture elements of an image by a dot pattern including plural dots arranged so as to have a two dimensional spread corresponding to the density of each picture element, step for transforming said each dot pattern to a one dimensional dot pattern, step for aligning said one dimensional dot patterns in a predetermined order successively in a direction of data compression, step for checking each dot of image data obtained by the above step successively in a direction of each dot row of said image data to decide whether or not a dot arrangement of a predetermined number of dots including the dot checked presently as an isolated black or white dot coincides with either of predetermined dot patterns, step for replacing said dot to a dot of another kind if it is either of said predetermined dot patterns, and step for performing data compression with respect to image data obtained by the above step.

* * * * *

UNITED STATES PATENT AND TRADEMARK OFFICE
CERTIFICATE OF CORRECTION

PATENT NO. : 5,121,197
DATED : June 9, 1992
INVENTOR(S) : Hirokazu Yamada, et al.

It is certified that error appears in the above-identified patent and that said Letters Patent is hereby corrected as shown below:

In Col. 9, line 26, after "preferred", insert --embodiment--.

In Col. 9, line 47, change "locating" to --located--.

In Col. 9, line 58, change "the top" to --The top--.

In Col. 9, line 61, change "notice" to --noticed--.

In Col. 10, line 20, change "synchronize" to --synchronization--.

In Col. 11, line 39, change "The" to --the--.

In Col. 11, line 44, change "The" to --the--.

In Col. 13, line 24, change "lo9ical" to --logical--.

In Col. 15, line 25 (Claim 8, line 1), after "wherein", insert --said--.

Signed and Sealed this

Third Day of August, 1993

Attest:

MICHAEL K. KIRK

*Attesting Officer*  *Acting Commissioner of Patents and Trademarks*